(12) United States Patent
Kambara et al.

(10) Patent No.: US 11,795,620 B2
(45) Date of Patent: Oct. 24, 2023

(54) POWDERY PAPER-STRENGTHENING AGENT, PAPER-STRENGTHENING AGENT SOLUTION, AND PAPER

(71) Applicant: ARAKAWA CHEMICAL INDUSTRIES, LTD., Osaka (JP)

(72) Inventors: Ryusuke Kambara, Osaka (JP); Daisuke Fujioka, Ibaraki (JP); Shogo Nishiura, Osaka (JP)

(73) Assignee: ARAKAWA CHEMICAL INDUSTRIES, LTD., Osaka (JP)

(*) Notice: Subject to any disclaimer, the term of this patent is extended or adjusted under 35 U.S.C. 154(b) by 0 days.

(21) Appl. No.: 17/976,051

(22) Filed: Oct. 28, 2022

(65) Prior Publication Data

US 2023/0065141 A1  Mar. 2, 2023

Related U.S. Application Data

(62) Division of application No. 17/262,285, filed as application No. PCT/JP2019/035361 on Sep. 9, 2019, now abandoned.

(30) Foreign Application Priority Data

Sep. 18, 2018  (JP) ................. 2018-173413

(51) Int. Cl.
*D21H 21/18* (2006.01)
*D21H 17/37* (2006.01)

(52) U.S. Cl.
CPC .......... *D21H 17/375* (2013.01); *D21H 21/18* (2013.01); *D10B 2401/063* (2013.01)

(58) Field of Classification Search
CPC ...... D21H 21/18; D21H 17/375; D21H 17/37; C08F 220/48; C08F 229/56; C08F 220/06; C08F 228/02
USPC .................................... 162/168.3
See application file for complete search history.

(56) References Cited

U.S. PATENT DOCUMENTS

| | | |
|---|---|---|
| 10,378,154 B2 | 8/2019 | Luo et al. |
| 2014/0243458 A1 | 8/2014 | Tonami et al. |
| 2016/0340831 A1 | 11/2016 | Sato et al. |
| 2019/0085105 A1 | 3/2019 | Mukunoki et al. |
| 2022/0169767 A1 | 6/2022 | Nishiura et al. |

FOREIGN PATENT DOCUMENTS

| | | |
|---|---|---|
| CN | 107604755 A | 1/2018 |
| JP | 105-098595 A | 4/1993 |
| JP | H10-25691 A | 1/1998 |
| JP | H10-195115 A | 7/1998 |
| JP | 2002-265740 A | 9/2002 |
| JP | 2012-251252 A | 12/2012 |
| JP | 2013-060498 A | 4/2013 |
| JP | 2018-12909 A | 1/2018 |
| JP | 2018-513286 A | 5/2018 |
| WO | 2011-122405 A | 10/2011 |
| WO | 2013/031245 A1 | 3/2013 |
| WO | 2017/209105 A1 | 12/2017 |
| WO | 2020/059557 A1 | 3/2020 |

OTHER PUBLICATIONS

International Search Report in PCT/JP2019/035361, dated Oct. 21, 2019.
Notification of Transmittal of Translation of the International Preliminary Report on Patentability with attached English translation of the International Preliminary Report on Patentability and Written Opinion of the International Searching Authority in PCT/JP2019/035361, dated Apr. 1, 2021.
Japanese Office Action dated Jun. 15, 2021 in Japanese Patent Application No. 2020-548349 with computer-generated English translation.

*Primary Examiner* — Mark Halpern
(74) *Attorney, Agent, or Firm* — Collard & Roe, P.C.

(57) ABSTRACT

A method for manufacturing a powdery paper-strengthening agent including a branched (meth)acrylamide-based polymer (A) which includes a step of obtaining (A) component by polymerizing (meth)acrylamide (a1), anionic vinyl monomer (a2), cationic vinyl monomer (a3) and crosslinkable vinyl monomer (a4) in a solvent in a presence of a polymerization initiator, a step of dropping or putting the above (A) component into an organic solvent to form a precipitate, and a step of drying and pulverizing (A) component obtained as the precipitate.

5 Claims, No Drawings

POWDERY PAPER-STRENGTHENING AGENT, PAPER-STRENGTHENING AGENT SOLUTION, AND PAPER

CROSS REFERENCE TO RELATED APPLICATIONS

This application is a divisional of and Applicant claims priority under 35 U.S.C. §§ 120 and 121 of U.S. application Ser. No. 17/262,285 filed on Jan. 22, 2021, which application is a national stage application under 35 U.S.C. § 371 of PCT Application No. PCT/JP2019/035361 filed on Sep. 9, 2019, which claims priority under 35 U.S.C. § 119 from Japanese Patent Application No. 2018-173413 filed on Sep. 18, 2018, the disclosures of each of which are hereby incorporated by reference. A certified copy of priority Japanese Patent Application No. 2018-173413 is contained in parent U.S. application Ser. No. 17/262,285. The International Application under PCT article 21(2) was not published in English.

TECHNICAL FIELD

The present invention relates to a powdery paper-strengthening agent, a paper-strengthening agent solution, and paper.

BACKGROUND ART

The paper-strengthening agent is a chemical that increase strength of paper by adding it to a raw material for pulp in a papermaking process or coating it to a surface of paper once made. Most of the paper-strengthening agents are in a form of an aqueous solution (Patent Document 1) and can be added or coated immediately after diluted with water or the like. On the other hand, when a cationic vinyl monomer is comprised in constituents of the paper-strengthening agent, the paper-strengthening agent is gradually decomposed and is likely to decrease in paper-strengthening effect over time.

Therefore, the powdery paper-strengthening agent is known as a form other than the form of the aqueous solution. For example, an acrylamide-based polymer composition (Patent Document 2) comprising acrylamide and one or more compounds selected from a particular 5-mercapto-1,3,4-thiadiazole derivative and/or a salt thereof is known. The acrylamide-based polymer composition of Patent Document 2 is reduced to powder by being dried and pulverized.

PRIOR ART DOCUMENT

Patent Document
Patent Document 1: JP 2012-251252 A
Patent Document 2: JP 2002-265740 A

SUMMARY OF THE INVENTION

However, the acrylamide-based polymer composition of Patent Document 2 has no branched structures, which decreases paper-strengthening effect of paper to be obtained by using the composition. The present invention has been made in view of such a problem, and it is an object of the present invention to provides a powdery paper-strengthening agent that is excellent in storage stability for a long period of time and exhibits high paper-strengthening effect of paper obtained by being added.

The present inventors have made intensive studies focusing on the fact that the powdery paper-strengthening agent exhibits excellent storage stability and enhances the paper-strengthening effect of paper immediately after production and after long-term storage to find out that particular powder of (meth)acrylamide-based polymers solves the above-described problem and completed the present invention. The powdery paper-strengthening agent, the paper-strengthening agent solution, and the paper of the present invention that solve the above-described problem mainly have the following features.

A powdery paper-strengthening agent according to one aspect of the present invention that solves the above-described problem is a powdery paper-strengthening agent comprising a branched (meth)acrylamide-based polymer (A).

Moreover, a paper-strengthening agent solution according to one aspect of the present invention that solves the above-described problem is a paper-strengthening agent solution comprising the above-described powdery paper-strengthening agent and water.

Furthermore, paper according to one aspect of the present invention that solves the above-described problem is paper to which the above-described paper-strengthening agent solution is given.

EMBODIMENT FOR CARRYING OUT THE INVENTION

<Powdery Paper-Strengthening Agent>

The powdery paper-strengthening agent according to one embodiment of the present invention comprises a branched (meth)acrylamide-based polymer (A) (hereinafter, referred to as "(A) component"). The powdery paper-strengthening agent of the present embodiment is excellent in storage stability for a long period of time by having such features. Moreover, such a powdery paper-strengthening agent can give high paper-strengthening effect to paper obtained, by being added to pulp slurry. Besides, in the present embodiment, "(meth)acrylic" includes both methacrylic and acrylic.

(Branched (Meth)Acrylamide-Based Polymer (A) ((A) Component))

Constituents of (A) component are not particularly limited. For example, (A) component may be any component that comprise (meth)acrylamide, such as (meth)acrylamide (a1) (hereinafter, also referred to as (a1) component), anionic vinyl monomer (a2) (hereinafter, also referred to as (a2) component), cationic vinyl monomer (a3) (hereinafter, also referred to as (a3) component), and crosslinkable vinyl monomer (a4) (hereinafter, also referred to as (a4) component). A powdery paper-strengthening agent to be obtained can give an excellent paper-strengthening effect to paper by comprising the above-described (a1) to (a4) components as constituents of (A) component.

(Meth)Acrylamide (a1) ((a1) Component)

(a1) component comprises at least one of methacrylamide and acrylamide.

A content of (a1) component is not particularly limited. For example, the content of (a1) component is preferably 59.5 mol % or more, more preferably 60 mol % or more, and further preferably 80 mol % or more in (A) component. Moreover, the content of (a1) component is preferably 98 mol % or less in (A) component. When the content of (a1) component is within the above-described ranges, an excellent paper-strengthening effect can be given to paper to be obtained.

Anionic Vinyl Monomer (a2) ((a2) Component)

(a2) component is not particularly limited as long as it is a vinyl monomer exhibiting anionic property. For example, (a2) component includes unsaturated carboxylic acids such as (meth)acrylic acid, itaconic acid, itaconic anhydride, fumaric acid, and maleic acid; unsaturated sulfonic acids such as vinyl sulfonic acid and metalyl sulfonic acid, or the like. Moreover, (a2) component may be an alkali metal salt such as a sodium salt and a potassium salt of these components, or may be a salt such as an ammonium salt. (a2) component may be used in combination.

A content of (a2) component is not particularly limited. For example, the content of (a2) component is preferably 0.5 mol % or more in (A) component. Moreover, the content of (a2) component is preferably 20 mol % or less, more preferably 10 mol % or less, and further preferably 5 mol % or less in (A) component. When the content of (a2) component is within the above-described ranges, the powdery paper-strengthening agent is enhanced in interaction with cationic paper chemicals (for example, aluminum sulfate, etc.) to be added at the time of papermaking and can give an excellent paper-strengthening effect to paper to be obtained.

(a2) component of the present embodiment preferably comprises at least either unsaturated sulfonic acids or salts thereof, and more preferably comprises metalyl sulfonic acid or sodium methallylsulfonate, from the viewpoint of being able to give high paper-strengthening effect to paper to be obtained in adding a powdery paper-strengthening agent to produce paper by increasing the weight-average molecular weight of (A) component to be obtained.

When unsaturated sulfonic acids are comprised, a content of the unsaturated sulfonic acids is not particularly limited. For example, the content of the unsaturated sulfonic acids is preferably 0.1 mol % or more in (A) component. Moreover, the content of the unsaturated sulfonic acids is preferably 2 mol % or less, and more preferably 1 mol % or less in (A) component. When the content of the unsaturated sulfonic acids is within the above-described ranges, a weight-average molecular weight of (A) component to be obtained is likely to be increased. Furthermore, a powdery paper-strengthening agent to be obtained can give a high paper-strengthening effect to paper to be obtained when paper is produced by adding a powdery paper-strengthening agent immediately after production. In addition, the high paper-strengthening effect can be maintained even when paper is produced by adding a powdery paper-strengthening agent after long-term storage.

Cationic Vinyl Monomer (a3) ((a3) Component)

(a3) component is not particularly limited as long as it is a vinyl monomer exhibiting cationic property. For example, (a3) component is a tertiary amino group-containing vinyl monomer or the like. The tertiary amino group-containing vinyl monomer is not particularly limited. For example, the tertiary amino group-containing vinyl monomer includes tertiary amino group-containing (meth)acrylate such as N,N-dimethylaminoethyl (meth)acrylate and N,N-diethylaminoethyl (meth)acrylate; tertiary amino group-containing alkyl (meth)acrylamide such as N,N-dimethylaminopropyl (meth)acrylamide and N,N-diethylaminopropyl (meth)acrylamide, or the like. (a3) component may be a quaternary salt of a tertiary amino group-containing vinyl monomer. The quaternary salt of the tertiary amino group-containing vinyl monomer is not particularly limited. For example, the quaternary salt of the tertiary amino group-containing vinyl monomer includes inorganic acid salts such as a hydrochloride or sulfate of a tertiary amino group-containing vinyl monomer; organic acid salts such as an acetate; a salt obtained by reacting a tertiary amino group-containing vinyl monomer with a quaternary agent, or the like. The quaternary agent is not particularly limited. For example, the quaternary agent includes methyl chloride, benzyl chloride, dimethyl sulfate, epichlorohydrin, or the like. (a3) component may be used in combination. Among them, (a3) component preferably includes at least one of a tertiary amino group-containing (meth)acrylate and a quaternary salt thereof from the viewpoint of an excellent copolymerization with (a1) component, and more preferably includes a quaternary salt of N,N-dimethylaminoethyl (meth)acrylate, and further preferably includes N,N-dimethylaminoethyl acrylate benzyl chloride, from the viewpoint that (A) component having a higher molecular weight is likely to be obtained.

A content of (a3) component is not particularly limited. For example, the content of (a3) component is preferably 0.5 mol % or more, and more preferably 0.6 mol % or more in (A) component. Moreover, the content of (a3) component is preferably 20 mol % or less, and more preferably 10 mol % or less in (A) component. When the content of (a3) component is within the above-described ranges, a powdery paper-strengthening agent to be obtained has high paper-strengthening effect when paper is produced.

Crosslinkable Vinyl Monomer (a4) ((a4) Component)

(a4) component is a component for introducing a branched structure into (A) component and is not particularly limited as long as it is a vinyl monomer having crosslinkability. For example, (a4) component includes vinyl monomers having a N,N-substituted amide group such as N,N-dimethylacrylamide, N,N-diethyl (meth)acrylamide, and N,N-diisopropyl (meth)acrylamide; vinyl monomers having a N-substituted amide group such as N-methyl (meth)acrylamide, N-ethyl (meth)acrylamide, N-isopropyl (meth)acrylamide, and N-t-butyl (meth)acrylamide; N,N-methylenebisacrylamide, 1,3,5-triacrylhexahydro-1,3,5-triazine, or the like. (a4) component may be used in combination. Among them, (a4) component preferably includes vinyl monomers having a N,N-substituted amide group, and more preferably includes N,N-dimethylacrylamide. Therefore, (A) component to be obtained is likely to increase the weight-average molecular weight. In addition, a powdery paper-strengthening agent to be obtained is likely to obtain high paper-strengthening effect when paper is produced using the powdery paper-strengthening agent, both immediately after production and after long-term storage.

A content of (a4) component is not particularly limited. For example, the content of (a4) component is preferably 0.001 mol % or more in (A) component. Moreover, the content of (a4) component is preferably 1 mol % or less, more preferably 0.8 mol % or less, and further preferably 0.5 mol % or less in (A) component. When the content of (a4) component is within the above-described ranges, a weight-average molecular weight of (A) component to be obtained is likely to be increased. Furthermore, a cross-linking reaction of (A) component to be obtained is likely to appropriately proceed, and gelation of (A) component to be obtained is unlikely to occur.

Vinyl Monomer (a5) ((a5) Component)

(A) component may comprise, in addition to (a1) to (a4) components appropriately comprised, a vinyl monomer (a5) (hereinafter, referred to as (a5) component) different from (a1) to (a4) components. (a5) component is not particularly limited. For example, (a5) component includes aromatic vinyl monomers such as styrene, α-methylstyrene, and vinyltoluene; alkyl (meth)acrylate such as methyl (meth) acrylate, ethyl (meth)acrylate, propyl (meth)acrylate, butyl (meth)acrylate, 2-ethylhexyl (meth)acrylate, and cyclohexyl (meth)acrylate; vinyl carboxylic acid esters such as vinyl acetate and vinyl propionate. (a5) component may be used in combination.

A content of (a5) component is not particularly limited. For example, the content of (a5) component is preferably less than 5 mol % in (A) component. When the content of (a5) component is within the above-described range, high paper-strengthening effect can be given to paper.

Another Component (a6) ((a6) Component)

When (A) component is produced, another component (a6) (hereinafter, referred to as (a6) component) may be used in addition to the above-described (a1) to (a5) components. (a6) component is not particularly limited. For example, (a6) component includes mercaptans such as 2-mercaptoethanol and n-dodecyl mercaptan; alcohols such as ethanol, isopropyl alcohol and pentanol; aromatic compounds such as an α-methylstyrene dimer, ethylbenzene, isopropylbenzene, and cumene; carbon tetrachlorides; organic acids such as citric acid, succinic acid, and oxalic acid; inorganic acids such as hydrochloric acid, sulfuric acid, and phosphoric acid; inorganic bases such as sodium hydroxide, potassium hydroxide, and calcium hydroxide; additives such as a defoaming agent and an antioxidant, or the like. (a6) component may be used in combination.

A content of (a6) component is not particularly limited. For example, the content of (a6) component is preferably 0.001 parts by mass or more based on 100 parts by mass of other components constituting (A) component (for example, (a1) to (a5) components). Moreover, the content of (a6) component is preferably 5 parts by mass or less based on 100 parts by mass of other components constituting (A) component. When the content of (a6) component is within the above-described ranges, a high paper-strengthening effect can be given to paper.

A method of producing a powdery paper-strengthening agent of the present embodiment is not particularly limited. For example, the powdery paper-strengthening agent can be produced by a method of irradiating with an electron beam, an ultraviolet light, a visible light, or the like (hereinafter, also referred to as an "irradiation step") and pulverizing the obtained massive (A) component.

Specifically, in the irradiation step, for example, the above-described (a1) to (a4) components and, if necessary, (a5) to (a6) components are mixed, and a polymerization initiator is added. An electron beam, an ultraviolet light, a visible light, or the like is thereafter irradiated. Besides, a solvent is preferably used to dissolve (a1) to (a6) components. The solvent is not particularly limited. For example, the solvent is water.

A total concentration of each component at the time of polymerization is not particularly limited. For example, the concentration is preferably 20% by weight or more, and more preferably 25% by weight or more. Moreover, the concentration is preferably 80% by weight or less, and more preferably 60% by weight or less. When the concentration is within the above-described ranges, (A) component to be obtained can be dried in a short period of time, and the polymerization degree is likely to be appropriately adjusted.

A polymerization initiator may be compounded when (A) component is produced. The polymerization initiator is not particularly limited. For example, the polymerization initiator includes persulfates such as ammonium persulfate, potassium persulfate, and sodium persulfate; azo-based compounds such as 2,2'-azobis(2-amidinopropane)hydrochloride and 2,2'-azobis[2(2-Imidazoline-2-yl)propane]hydrochloride; hydrogen peroxide, or the like. The polymerization initiator may be used in combination. Among them, the polymerization initiator is preferably ammonium persulfate, potassium persulfate, or 2,2'-azobis(2-amidinopropane) hydrochloride, from the viewpoint of sufficiently advancing solution polymerization. Moreover, a method of adding the polymerization initiator is not particularly limited. For example, the method includes a batch addition, a dividing addition, a continuous dropping, or the like. Furthermore, a content of the polymerization initiator is not particularly limited. For example, the content of the polymerization initiator is preferably 0.001 parts by mass or more, and more preferably 0.01 parts by mass or more, based on 100 parts by mass of (a1) to (a5) components. Moreover, the content of the polymerization initiator is preferably 5 parts by mass or less, and more preferably 1 part by mass or less, based on 100 parts by mass of (a1) to (a5) components.

When photopolymerization is performed, a photopolymerization initiator can be used. The photopolymerization initiator is not particularly limited as long as it is an initiator that is decomposed by light to generate an initiator radical. For example, the photopolymerization initiator includes the above-described azo-based initiators, α-hydroxyketones, acylphosphine oxide compounds, or the like. More specifically, the photopolymerization initiator includes 1-hydroxycyclohexylphenylketone, 2-hydroxy-2-methyl-1-phenylpropan-1-one, 1-[4-(2-hydroxyethoxy)-phenyl]-2-hydroxy-2-methyl-1-propane-1-one, bis(2,4,6-trimethylbenzoyl) phenylphosphine oxide, 2,4,6-trimethylbenzoyldiphenylphosphine oxide, benzoin, benzoin ethyl ether, benzophenone, or the like. Moreover, the photopolymerization initiator is preferably diluted with water and added to a mixed solution of monomer components. When the photopolymerization initiator is insoluble in water, it may be diluted and added with alcohols such as ethanol and isopropanol or organic solvents such as acetone and toluene.

A temperature when the polymerization initiator or the photopolymerization initiator is added is not particularly limited. For example, the temperature is 10 to 80° C. When a photosensitizer is added for irradiating with an ultraviolet light, a visible light, an electron beam, or the like, the temperature is preferably 0° C. or higher, and more preferably 10 to 40° C.

In the case of photopolymerization, it is preferable to irradiate with light in an ultraviolet region (particularly, a near ultraviolet ray). A device for generating a near-ultraviolet ray is not particularly limited. For example, the device for generating a near-ultraviolet ray includes a high-pressure mercury lamp, a low-pressure mercury lamp, a metal halide lamp, a fluorescent chemical lamp, a fluorescent blue lamp, or the like. Moreover, a wavelength region of the near-ultraviolet ray is preferably 300 to 500 nm.

An irradiation intensity of the ultraviolet ray is not particularly limited. For example, the irradiation intensity is 0.1 to 100 W/m$^2$. Above all, the irradiation intensity is preferably 10 W/m$^2$ or less, more preferably 8 W/m$^2$ or less, and further preferably 6 W/m$^2$ or less. Moreover, the irradiation intensity of the near-ultraviolet ray may be constant or changed during irradiation with the near-ultraviolet ray for polymerization.

A form of a reaction vessel used for polymerization is not particularly limited. For example, the reaction vessel may be in a form of a thin film such as a sheet or may be in a thick form such as a rectangular parallelepiped.

After polymerization, the obtained massive (meth)acrylamide-based polymer is pulverized. As a pulverization method, the massive (meth)acrylamide-based polymer may be pulverized as it is, or dried and pulverized, or (meth)acrylamide-based polymer comprising a part of solvent may be crushed, and pulverized after drying.

A crushing device is not particularly limited. For example, the crushing device includes a grinder (a stone mill type pulverizer), a high pressure homogenizer, an ultrahigh pressure homogenizer, a high pressure collision type pulverizer, a ball mill, a bead mill, a vibration mill, a cone crusher, a hammer crusher, or the like. An average particle size of (A) component after crushing is preferably 0.5 to 20 mm, and more preferably 1 to 10 mm. When the average particle size is less than 0.5 mm, a load on the crushing device tends to increase. Moreover, when the average particle size exceeds 20 mm, there is a tendency to be difficult for (meth)acrylamide-based polymer to be sufficiently dried to the inside at the time of drying.

A drying method is not particularly limited. For example, the drying method includes a hot air drying such as by use of a circulation dryer; a conductive heat transfer drying such as a vacuum drying and a dryer drying; a radiant heat drying such as by use of an infrared ray and an electromagnetic wave, or the like. Moreover, drying conditions are not particularly limited. For example, a drying temperature is about 50 to 150° C. (preferably 50 to 105° C.), and a drying time is about 0.5 to 240 minutes (preferably 1 to 180 minutes). In addition, the dryer drying is not particularly limited. For example, the dryer drying is performed with a double drum dryer, a single drum dryer, a twin drum dryer, or the like.

A pulverizing device is not particularly limited. For example, the pulverizing device includes a grinder (a stone mill type pulverizer), a high pressure homogenizer, an ultrahigh pressure homogenizer, a high pressure collision type pulverizer, a ball mill, a bead mill, a vibration mill, or the like.

The powdery paper-strengthening agent of the present embodiment can be also obtained through a step of dissolving (a1) component, (a2) component, (a3) component and (a4) component in a solvent and polymerizing them (hereinafter, referred to as "solution polymerization"), and then a step of drying and pulverizing the obtained (A) component.

Solution polymerization is method of polymerizing (a1) to (a4) components and, if necessary, (a5) to (a6) components, etc. in a solvent in the presence of a polymerization initiator, by, for example, a conventionally known drop polymerization method, a simultaneous polymerization method, or a combination thereof, etc. to obtain a solution of a (meth)acrylamide-based polymer. As the solvent, water is preferably used from the viewpoint of dissolving a constituent constituting (A) component.

Polymerization conditions are not particularly limited. For example, the polymerization conditions include a method of adding a mixed solution of (a1) to (a6) components and a solution of a polymerization initiator into a solvent (preferably water) charged in a reaction apparatus in advance, respectively, followed by polymerizing them at about 50 to 100° C. for 1 to 8 hours.

The polymerization initiator is not particularly limited. A type and an amount of the polymerization initiator are similar with those described above.

Next, the obtained (A) component is dried and pulverized. Besides, the obtained (A) component may be dried and pulverized at the same time, or may be pulverized after being dried.

The drying method is not particularly limited. The drying method is similar with the above-described methods.

The drying conditions are not particularly limited. For example, the drying conditions include a temperature of about 60 to 150° C. (preferably 80 to 130° C.) and about 0.5 to 10 minutes (preferably 0.5 to 5 minutes).

The pulverizing method, the pulverizing device, etc. are not particularly limited. The pulverizing method, the pulverizing device, etc. are similar with the above-described ones.

In addition, the powdery paper-strengthening agent of the present embodiment can be also obtained by a manufacturing method through a step of dropping or putting (A) component obtained by the above-described solution polymerization into an organic solvent to form a precipitate and a step of drying and pulverizing (A) component obtained as the precipitate. The method has an advantage that decomposition of (A) component is likely to be suppressed.

The organic solvent used to form a precipitate is not particularly limited. For example, the organic solvent is preferably an aqueous solvent, more preferably alcohols such as methanol and ethanol; ketone such as acetone, or the like, further preferably an alcohol, from the viewpoint of facilitating volatilization of the organic solvent during drying without relatively dissolving (A) component. The alcohol is preferably methanol. The organic solvent may be used in combination.

An amount of the organic solvent used is not particularly limited. For example, the amount of the organic solvent used is preferably about 300 to 10,000 parts by mass based on 100 parts by mass of a solution of (A) component from the viewpoint of facilitating precipitation of (A) component more efficiently.

After forming the precipitate, the obtained precipitate of (A) component is recovered such as by being filtered with a wire mesh or the like. The recovered precipitate of (A) component is preferably dried since it volatilizes the organic solvent. The drying method is not particularly limited. The drying method is similar with the above-described methods. The drying conditions are also not particularly limited. For example, the drying conditions include a drying temperature of about 50 to 150° C. (preferably 50 to 105° C.) and a drying time of about 30 to 240 minutes (preferably 30 to 180 minutes).

The pulverizing method, the pulverizing device, etc. are not particularly limited. The pulverizing method, the pulverizing device, etc. are similar with the above-described ones.

An average particle size of the powdery paper-strengthening agent obtained by these methods described above is not particularly limited. For example, the average particle size is preferably about 0.01 to 2 mm from the viewpoint of facilitating dissolution of the powdery paper-strengthening agent in a solvent such as water.

A physical property of (A) component (or a powdery paper-strengthening agent) is not particularly limited. For example, a weight-average molecular weight of (A) component (meaning a value obtained by a gel permeation chromatography (GPC) method; the same applies hereinafter) is preferably 1,000,000 to 8,000,000, and more preferably 1,300,000 to 7,000,000, from the viewpoint of ensuring a sufficient paper-strengthening effect of paper.

The paper-strengthening agent solution of the present embodiment comprises the above-described powdery paper-strengthening agent and water.

Method of preparing a paper-strengthening agent solution is not particularly limited. For example, the paper-strengthening agent solution may be prepared by adding water to the powdery paper-strengthening agent all at once and mixing them, may be prepared by adding water with being divided and mixing them, or may be prepared by adding the powdery paper-strengthening agent to water and mixing them. Mixing means is not particularly limited. For example, the mixing means is a stirrer or the like. The paper-strengthening agent solution may be heated during mixing. Temperature during mixing is not particularly limited. For example, the temperature during mixing is preferably about 5 to 60° C., and more preferably about 10 to 50° C.

Solid content concentration of the paper-strengthening agent solution is not particularly limited. For example, the solid content concentration is preferably 5 to 40% by weight. Moreover, viscosity of the paper-strengthening agent solution at a temperature of 25° C. in an aqueous solution having a concentration of 5% by weight is preferably about 5 to 1,000 mPa·s. Besides, the viscosity is value measured with a Brookfield viscometer (a B-type viscometer).

The paper-strengthening agent solution may comprise various additives, if necessary. The additives include acid, alkali, a defoaming agent, preservative, a chelating agent such as a citric acid; a water-soluble aluminum compound, a Glauber's salt, urea, polysaccharide, or the like.

Paper of the present embodiment is obtained by applying the above-described paper-strengthening agent solution. Method of obtaining paper is not particularly limited. For example, paper can be obtained such as by containing a paper-strengthening agent solution into a raw material pulp slurry or coating a surface of base paper. In addition, the paper-strengthening agent solution is preferably diluted with water. A concentration of the aqueous solution after being diluted is preferably 0.01 to 3% by weight.

An amount of the paper-strengthening agent solution used (in terms of solid content) is not particularly limited. For example, the amount of the paper-strengthening agent solution used is about 0.01 to 4% by weight based on a dry weight of a pulp. A type of the pulp is not particularly limited. For example, the type of the pulp includes chemical pulps such as Leaf Bleached Kraft Pulp (LBKP) and Needle Bleached Kraft Pulp (NBKP); mechanical pulps such as Ground Pulp (GP), Refiner Ground Pulp (RGP), and Thermomechanical Pulp (TMP); recycled pulps such as a waste corrugated fiberboard, or the like. In addition, when a paper-strengthening agent solution is contained, pH adjusters such as a sulfuric acid or sodium hydroxide; fixing agents such as aluminum sulfate; paper chemicals such as a sizing agent and a wet paper-strengthening agent; a loading material such as talc, clay, kaolin, and calcium carbonate, and the like may be added.

When the paper-strengthening agent solution is coated on the surface of the base paper, the paper-strengthening agent solution is coated on the surface of the base paper by various known means. A viscosity of a diluted solution is not particularly limited. For example, the viscosity of the diluted solution is 1 to 40 mPa·s at a temperature of 50° C. A type of the base paper is not particularly limited. For example, uncoated paper made from wood cellulose fibers as the base paper can be used. A coating means is not particularly limited. For example, the coating means is a bar coater, a knife coater, an air knife coater, a calender, a gate roll coater, a blade coater, a two-roll size press, a rod metering, or the like. An amount of the paper-strengthening agent solution applied (in terms of solid content) is not particularly limited. The amount is preferably about 0.001 to 2 g/m², and more preferably about 0.005 to 1 g/m².

Paper of the present embodiment can be used for various products. For example, paper of the present embodiment can be used for coated base paper, newspaper, liner, core, paper tube, printing writing paper, form paper, PPC paper, cup base paper, inkjet paper, heat-sensitive paper, or the like.

One embodiment of the present invention has been described above. The present invention is not particularly limited to the above-described embodiments. The above-described embodiments mainly explain inventions having the following features.

(1) A powdery paper-strengthening agent comprising a branched (meth)acrylamide-based polymer (A).

According to such a feature, the powdery paper-strengthening agent has an excellent storage stability for a long period of time. Moreover, such a powdery paper-strengthening agent can give a high paper-strengthening effect by being added to paper.

(2) The powdery paper-strengthening agent of (1), wherein (A) component comprises (meth)acrylamide (a1), anionic vinyl monomer (a2), cationic vinyl monomer (a3), and crosslinkable vinyl monomer (a4).

According to such a feature, the powdery paper-strengthening agent exerts more excellent paper-strengthening effect.

(3) The powdery paper-strengthening agent of (2), wherein (a2) component comprises at least either unsaturated sulfonic acids or salts thereof.

According to such a feature, the powdery paper-strengthening agent exerts a more excellent paper-strengthening effect.

(4) The powdery paper-strengthening agent of (2) or (3), wherein (a4) component comprises a vinyl monomer having a N,N-substituted amide group.

According to such a feature, a weight-average molecular weight of a branched (meth)acrylamide-based polymer to be obtained is likely to become large. Moreover, the powdery paper-strengthening agent exhibits a more excellent paper-strengthening effect.

(5) The powdery paper-strengthening agent of any one of (2) to (4), wherein a content of (a1) component is 59.5 to 98 mol % in (A) component, a content of (a2) component is 0.5 to 20 mol % in (A) component, a content of (a3) component is 0.5 to 20 mol % in (A) component, and a content of (a4) component is 0.001 to 1 mol % in (A) component.

According to such a feature, the powdery paper-strengthening agent is likely to give a sufficient paper-strengthening effect to paper.

(6) The powdery paper-strengthening agent of any one of (1) to (5), wherein a weight-average molecular weight of (A) component is 1,000,000 to 8,000,000.

According to such a feature, the powdery paper-strengthening agent is likely to give a sufficient paper-strengthening effect to paper.

(7) A paper-strengthening agent solution comprising the powdery paper-strengthening agent of any one of (1) to (6) and water.

According to such a feature, the paper-strengthening agent solution can give a high paper-strengthening effect by being added to paper.

(8) Paper to which the paper-strengthening agent solution of (7) is given.

According to such a feature, paper to be obtained is given a paper-strengthening agent solution comprising the above-described powdery paper-strengthening agent and exhibits a high paper-strengthening effect.

EXAMPLE

The present invention will be described below with reference to Examples. The present invention is not limited to these Examples. Besides, unless otherwise specified, "part(s)" and "%" in Examples and Comparative examples are based on weight.

The following abbreviations represent the following compounds, respectively.
AM: Acrylamide
IA: Itaconic acid
AA: Acrylic acid
SMAS: Sodium methallylsulfonate
DM: N,N-dimethylaminoethyl methacrylate
DML: N,N-dimethylaminoethyl methacrylate benzyl chloride
MBAA: N,N'-methylenebisacrylamide
DMAA: N,N-dimethylacrylamide
APS: Ammonium persulfate (Weight-Average Molecular Weight)

A weight-average molecular weight and a molecular weight distribution were measured under the following measurement conditions by a gel permeation chromatography (GPC) method.
Column: one guard column PWXL and two GMPWXL, manufactured by Tosoh Corporation
Eluent: phosphoric acid buffer (an aqueous solution of 0.05 mol/L phosphoric acid (manufactured by FUJIFILM Wako Pure Chemical Corporation)+0.13 mol/L sodium dihydrogen phosphate (manufactured by FUJIFILM Wako Pure Chemical Corporation), pH: about 2.5)
Flow rate: 0.8 mL/min
Temperature: 40° C.
RI detector: Shodex RI-101, manufactured by Showa Denko K.K.
MALS detector: DAWN HELEOS-II, manufactured by WYATT
Measurement sample: measurement was performed by diluting with the above-described eluent so that a concentration of (A) component becomes 0.1%.

Example 1

581.3 parts of ion-exchanged water was placed in a reactor equipped with a stirrer, a thermometer, a reflux condenser, a nitrogen gas introduction pipe, and two dropping funnels to remove oxygen in a reaction system through nitrogen gas, followed by heated to 90° C. 533.19 parts of 50% aqueous solution of AM, 34.76 parts of DM, 104.55 parts of 60% aqueous solution of DML, 11.51 parts of IA, 7.97 parts of 80% aqueous solution of AA, 5.595 parts of SMAS, 0.0682 parts of MBAA, 1.75 parts of DMAA, and 426.48 parts of ion-exchanged water were charged to one dropping funnel to adjust the pH to 3 with 62.5% sulfuric acid. Moreover, 0.6 parts of APS and 180 parts of ion-exchanged water were placed in the other dropping funnel. Next, the monomers and the catalyst were added dropwise into the system from both dropping funnels over about 3 hours. After completion of the dropping, 0.4 parts of APS and 10 parts of ion-exchanged water were placed and kept warm for 1 hour, and 89.7 parts of ion-exchanged water was added, to obtain (A-1) component having a concentration of 20.0% and a weight-average molecular weight of 4,000,000. Physical properties of the constituents and the obtained (A-1) component are shown in Table 1 (the same applies hereinafter).

Next, 100 parts of the obtained (A-1) component was added dropwise into 1,500 parts of methanol, and then filtered through a wire mesh (100 mesh, SUS304) to obtain a precipitate. The precipitate was dried with a circulation dryer at a temperature of 105° C. for 3 hours, and then pulverized with a ball mill for 2 minutes to obtain a powdery paper-strengthening agent.

Examples 2 to 12, Comparative Examples 2 to 4

Synthesis was carried out in the similar manner as in Example 1 except that composition was changed as shown in Table 1, to obtain each powdery paper-strengthening agent.

Comparative Example 1

(A-1) component of Example 1 was used as it was in an aqueous solution.

For each of the paper-strengthening agents obtained in Examples 1 to 12 and Comparative examples 1 to 4, storage stability and specific burst strength were measured by the following evaluation methods. The results are shown in Table 1 or 2.

(Storage Stability)

Each of the powdery paper-strengthening agents and the aqueous solution of the paper-strengthening agent of Comparative Example 1 were stored for 2 months in a thermostat at a temperature of 40° C. Cation values before and after storage were measured. The cation values were calculated by Equation 1 shown below, and a cation decomposition rate was calculated by Equation 2. In addition, the cation values were measured by adjusting a pH of a solution diluted with a deionized water so that the concentration of the paper-strengthening agent was 0.5% to be 2.0 with hydrochloric acid, and then performing colloidal titration of toluidine blue as an indicator with an aqueous solution of potassium polyvinyl sulfate (factor: f=1.00) under 1/400 normality (N). A point at which color of the measurement solution changed from blue to reddish violet and the reddish violet color was retained for 10 seconds or longer was set as an end point.

$$(\text{Cation value}) \text{ (meq/g)} = 1/400 \times f \times V/(W \times C/100) \quad \text{(Equation 1)}$$

f: factor of an aqueous solution of potassium polyvinyl sulfate under 1/400 normality (N)
V: titration value (mL) of an aqueous solution of potassium polyvinyl sulfate under 1/400 normality (N)
W: amount (g) of paper-strengthening agent collected
C: concentration (%) of paper-strengthening agent $$(\text{Cation decomposition rate}) \text{ (\%)} = [\{(\text{cation value before storage}) - (\text{cation value after storage})\}/(\text{cation value before storage})] \times 100 \quad \text{(Equation 2)}$$

TABLE 1

| | AM (mol %) | (a2) (mol %) | | | (a3) (mol %) | | (a4) (mol %) | | Weight-average molecular weight (million) | Storage stability (40° C. × 2 months) (cation decomposition rate, %) |
|---|---|---|---|---|---|---|---|---|---|---|
| | | IA | AA | SMAS | DM | DML | MBAA | DMAA | | |
| Example 1 | 84.79 | 2 | 2 | 0.8 | 5 | 5 | 0.01 | 0.4 | 400 | 2 |
| Example 2 | 84.99 | 2 | 2 | 0.6 | 5 | 5 | 0.01 | 0.4 | 130 | 3 |
| Example 3 | 84.59 | 2 | 2 | 1 | 5 | 5 | 0.01 | 0.4 | 700 | 3 |
| Example 4 | 83.485 | 4 | 2 | — | 5 | 5 | 0.015 | 0.5 | 200 | 2 |
| Example 5 | 84.40 | 2 | 2 | 0.8 | 5 | 5 | — | 0.8 | 350 | 2 |
| Example 6 | 85.18 | 2 | 2 | 0.8 | 5 | 5 | 0.02 | — | 350 | 3 |
| Example 7 | 85.48 | 2 | 2 | 0.5 | 5 | 5 | — | 0.02 | 250 | 3 |

TABLE 1-continued

| | AM (mol %) | (a2) (mol %) | | | (a3) (mol %) | | (a4) (mol %) | | Weight-average molecular weight (million) | Storage stability (40° C. × 2 months) (cation decomposition rate, %) |
|---|---|---|---|---|---|---|---|---|---|---|
| | | IA | AA | SMAS | DM | DML | MBAA | DMAA | | |
| Example 8 | 80.696 | 0.4 | — | 0.5 | 18 | — | 0.004 | 0.4 | 300 | 4 |
| Example 9 | 97.89 | 0.4 | — | 0.6 | 0.6 | — | 0.01 | 0.5 | 650 | 1 |
| Example 10 | 62.996 | — | 18 | 0.5 | 18 | — | 0.004 | 0.5 | 200 | 4 |
| Example 11 | 80.09 | — | 18 | 0.8 | 0.6 | — | 0.01 | 0.5 | 500 | 1 |
| Example 12 | 89.496 | — | — | — | 10 | — | 0.004 | 0.5 | 400 | 3 |
| Comparative Example 1 | 84.79 | 2 | 2 | 0.8 | 5 | 5 | 0.01 | 0.4 | 400 | 30 |
| Comparative Example 2 | 85.8 | 2 | 2 | 0.2 | 5 | 5 | — | — | 300 | 2 |
| Comparative Example 3 | 86.0 | 2 | 2 | — | 5 | 5 | — | — | 1200 | 2 |
| Comparative Example 4 | 90.0 | — | — | — | 10 | — | — | — | 1000 | 3 |

*Comparative example 1 is in a form of an aqueous solution.

(Specific Burst Strength)

A waste corrugated fiberboard was beaten with a Niagara beater, and 1.5% of aluminum sulfate was added to the pulp adjusted to have 300 mL of Canadian Standard Freeness (C.S.F). 5% of a sodium hydroxide aqueous solution was added to adjust the pH to 6.7. Next, 1% of an aqueous solution of powdery paper-strengthening agent (a paper-strengthening agent solution) of each of Examples and Comparative examples (excluding Comparative example 1) was added at 1% to the pulp in terms of solid content, and the mixture was stirred, and then subjected to papermaking so as to have a basis weight of 180 g/m² with a TAPPI sheet machine and subjected to press dehydration at 5 kg/cm² for 2 minutes. Then, it was dried in a rotary dryer at 105° C. for 3 minutes and controlled in humidity for 24 hours under conditions of a temperature of 23° C. and a humidity of 50% to obtain paper. Moreover, the paper-strengthening agent solution of Comparative example 1 was diluted with an aqueous solution having a concentration of 1% and then added in the similar manner. Furthermore, each of the samples stored at a temperature of 40° C. for 2 months were also subjected to the similar procedure to obtain paper. Using paper obtained, a specific burst strength (kPa·m²/g) was measured according to JIS P 8131. In addition, a lowering rate (%) of a specific burst strength was calculated by the following Equation 3. The results represent that the larger the value of the specific burst strength is and the smaller the value of the lowering rate is, the more excellent the paper-strengthening effect is.

Lowering rate (%) of specific burst strength=[{(specific burst strength immediately after synthesis)−(specific burst strength after storage)}/(specific burst strength immediately after synthesis)]×100  (Equation 3)

TABLE 2

| | Paper-strengthening agent | Specific burst strength (kPa · m²/g) | | |
|---|---|---|---|---|
| | | Immediately after synthesis | 40° C. × 2 months after storage | Lowering rate (%) |
| Evaluation example 1 | Example 1 | 3.32 | 3.28 | 1.20 |
| Evaluation example 2 | Example 2 | 3.22 | 3.18 | 1.24 |
| Evaluation example 3 | Example 3 | 3.43 | 3.39 | 1.17 |
| Evaluation example 4 | Example 4 | 3.28 | 3.27 | 0.30 |
| Evaluation example 5 | Example 5 | 3.29 | 3.28 | 0.30 |
| Evaluation example 6 | Example 6 | 3.30 | 3.29 | 0.30 |
| Evaluation example 7 | Example 7 | 3.25 | 3.22 | 0.92 |
| Evaluation example 8 | Example 8 | 3.28 | 3.26 | 0.61 |
| Evaluation example 9 | Example 9 | 3.21 | 3.20 | 0.31 |
| Evaluation example 10 | Example 10 | 3.28 | 3.22 | 1.83 |
| Evaluation example 11 | Example 11 | 3.21 | 3.18 | 0.93 |
| Evaluation example 12 | Example 12 | 3.15 | 3.11 | 1.27 |
| Evaluation comparative example 1 | Comparative example 1 | 3.31 | 2.55 | 23.0 |
| Evaluation comparative example 2 | Comparative example 2 | 2.55 | 2.51 | 1.57 |
| Evaluation comparative example 3 | Comparative example 3 | 2.35 | 2.33 | 0.85 |
| Evaluation comparative example 4 | Comparative example 4 | 2.31 | 2.28 | 1.30 |

The invention claimed is:

1. A method for manufacturing a powdery paper-strengthening agent comprising a branched (meth)acrylamide-based polymer (A) which comprises
    a step of obtaining (A) component by polymerizing (meth)acrylamide (a1), anionic vinyl monomer (a2), cationic vinyl monomer (a3) and crosslinkable vinyl monomer (a4) in a solvent in a presence of a polymerization initiator,
    a step of dropping or putting the above (A) component into an organic solvent to form a precipitate and
    a step of drying and pulverizing (A) component obtained as the precipitate.

2. The method for manufacturing the powdery paper-strengthening agent of claim 1, wherein (a2) component comprises at least either unsaturated sulfonic acids or salts thereof.

3. The method for manufacturing the powdery paper-strengthening agent of claim 1, wherein (a4) component comprises a vinyl monomer having a N,N-substituted amide group.

4. The method for manufacturing the powdery paper-strengthening agent of claim 1, wherein
- a content of (a1) component is 59.5 to 98 mol % in (A) component,
- a content of (a2) component is 0.5 to 20 mol % in (A) component,
- a content of (a3) component is 0.5 to 20 mol % in (A) component, and
- a content of (a4) component is 0.001 to 1 mol % in (A) component.

5. The method for manufacturing the powdery paper-strengthening agent of claim 1, wherein a weight-average molecular weight of (A) component is 1,000,000 to 8,000,000.

* * * * *